United States Patent [19]
Lahat et al.

[11] Patent Number: 6,141,126
[45] Date of Patent: Oct. 31, 2000

[54] WAVE DIVISION MULTIPLEXING BASED OPTICAL SWITCH

[75] Inventors: Amir Lahat, Kibbutz Givat-Brenner; Yackov Sfadya, Kfar Saba, both of Israel

[73] Assignee: 3Com Corporation, Santa Clara, Calif.

[21] Appl. No.: 09/300,855

[22] Filed: Apr. 28, 1999

[51] Int. Cl.[7] .................................................. H04B 10/20
[52] U.S. Cl. ........................ 359/121; 359/120; 359/128
[58] Field of Search ................................... 359/120, 121, 359/128; 385/16, 17, 24

[56] References Cited

U.S. PATENT DOCUMENTS

| | | | |
|---|---|---|---|
| 5,483,536 | 1/1996 | Gunji et al. | 370/85.14 |
| 5,550,818 | 8/1996 | Brackett et al. | 370/60 |
| 5,566,014 | 10/1996 | Glance | 359/124 |
| 5,576,875 | 11/1996 | Chawki et al. | 359/125 |
| 5,617,233 | 4/1997 | Boncek | 359/123 |

(List continued on next page.)

FOREIGN PATENT DOCUMENTS 43 37 089 A1   4/1995   Germany ....................... H04B 10/20

OTHER PUBLICATIONS

Perlman, R., "Interconnections: Bridges and Routers", Addison–Wesley Publishing, Section 9.2.4, Chapter 9, pp. 205–264 (1992).
Sedgewick, R., "Algorithms", Second Edition, Addison–Wesley Publishing, Chapter 17, pp. 245–257 (1988).
Doeringer, W. et al., "Routing on Longest–Matching Prefixes", *IEEE/ACM Transactions on Networking*, vol. 4, No. 1, Feb. 1996, pp. 86–97.
Williams, K. A., "A Distributed ATM Network Based on an Optical Passive Star", printed from website http://williams.cs.ncat.edu/ATMStar.htm, 2 pages, (1998).
"All–optical ATM–Switch based on Self Electro–optic Effect Devices (SEED's)", printed from website http://www.stw.nl/projecten/T/tel3997.html, 2 pages, Feb. 2, 1997.
Chang, G. et al., "Multiwavelength Reconfigurable WDM/ATM/SONET Network Testbed", *Journal of Lightwave Technology*, vol. 14, No. 6, Jun. 1996.

(List continued on next page.)

*Primary Examiner*—Leslie Pascal
*Assistant Examiner*—Hanh Phan
*Attorney, Agent, or Firm*—Howard Zaretsky; David J. Weitz; Wilson Sonsini Goodrich & Rosati

[57] ABSTRACT

An optical switch utilizing WDM or DWDM techniques for use in both WAN and LAN environments. Each input to the switch is assigned a separate wavelength via a tunable transmitter. The output of the transmitters are input to a star coupler which combines all the optical signals into a single optical output signal. This signal is input to an optical demultiplexor which functions to split the incoming optical signal into a plurality of separate wavelengths with each wavelength steered to a particular output port. The output of each port, corresponding to a particular wavelength, is then converted into an electrical signal by a receiver. Unicast, broadcast and multicast calls are supported. A plurality of unicast connections can be established simultaneously by assigning each tunable transmitter a different wavelength such that all wavelengths are mutually exclusive with each other. In a broadcast connection, the source node transmits and all output ports receive the optical signal on the particular wavelength assigned to that port. The rest of the input ports are placed in an idle state. The output of each port is input to a multiplexor along with an output of the optical demux dedicated to broadcast traffic. A controller switches the multiplexors to output the broadcast signal such that all receivers output the same signal. Multicast traffic is handled similarly except that only selected multiplexors are switched. The remaining multiplexors carry unicast traffic as normal. As a result, the output ports of the members of the multicast group all output the same signal.

9 Claims, 3 Drawing Sheets

U.S. PATENT DOCUMENTS

| | | | |
|---|---|---|---|
| 5,625,478 | 4/1997 | Doerr et al. | 359/125 |
| 5,636,045 | 6/1997 | Okayama et al. | 359/140 |
| 5,717,510 | 2/1998 | Ishikawa et al. | 359/161 |
| 5,739,934 | 4/1998 | Nomura et al. | 359/124 |
| 5,760,934 | 6/1998 | Sutter et al. | 359/119 |
| 5,870,216 | 2/1999 | Brock et al. | 359/172 |
| 5,920,412 | 7/1999 | Chang | 359/128 |
| 5,930,016 | 7/1999 | Brorson et al. | 359/127 |

OTHER PUBLICATIONS

Oguchi, K., "Novel Wavelength–Division–Multiplexed Ring Network Architecture Usin Optical Path Technology for Multiple Services and Simple Media Access Control Procedure", *Fiber and Integrated Optics*, 16: pp. 159–180, 1997.

Karol M., "Exploiting the Attenuation of Fiber–Optic Passive Taps to Create Large High–Capacity LAN's and MAN's", *Journal of Lightwave Technology*, vol. 9, No. 3, Mar. 1991.

WAVE DIVISION MULTIPLEXING BASED OPTICAL SWITCH

FIELD OF THE INVENTION

The present invention relates generally to data communications networks and more particularly relates to an optical switching matrix capable of handling unicast, broadcast and multicast data traffic.

BACKGROUND OF THE INVENTION

More and more reliance is being placed on data communication networks to carry increasing amounts of data. In a data communications network, data is transmitted from end to end in groups of bits which are called packets, frames, cells, messages, etc. depending on the type of data communication network. For example, Ethernet networks transport frames, X.25 and TCP/IP networks transport packets and ATM networks transport cells. Regardless of what the data unit is called, each data unit is defined as part of the complete message that the higher level software application desires to send from one a source to a destination. Alternatively, the application may wish to send the data unit to multiple destinations.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

Current LAN Topology

Using ATM network technology as an example, the current topology of high performance ATM local area networks (LANs) includes ATM core switches at the backbone and an edge device having an ATM downlink to the one or more core switches. When a connection is established between two edge devices, the traffic must pass through the ATM switches in the core. Therefore, in order to support all potential connections between all edge devices, the ATM switches at the core need to be non blocking. Non blocking ATM switches are difficult to develop and thus are much more expensive.

In addition to the above disadvantage, the resulting network may be limited in bandwidth. When attempting to establish large numbers of connection from the edge device, there may be a need for faster downlink data rates. Depending on the number of connections and the throughput required for each connection, the downlink capacity might not be sufficient to meet the needs of the users.

An additional disadvantage is the amount of physical wiring required to implement such a network. In practice, each edge device must be connected to the ATM core via physical wires (i.e., cables). When considering a typical office building there may be many wires installed in parallel. A separate cable from each edge device on each floor must be run down to the ATM core farm that typically is located in the basement. Wherever the switch core farm or server farm is located, cables must be run from the switch core farm to each edge device. The total length of the required cabling can be relatively very high and thus have an associated very high cost.

The cost may be even higher depending on the type and length of cabling used. For example, in ATM networks, it is common to run high speed fiber optic cable from the ATM switch core to all the edge devices in the network. Data rates may range from OC-3 155 Mbps to OC-12 622 Mbps on the optical fiber, for example. Note that each optical fiber used in the network carries only a single communication channel using a single wavelength of light. If it is desired to maintain several communications channels at one time, more than one optical fiber is required. Using prior art transmission techniques, each communication channel requires a separate optical fiber.

Today, most legacy local area networks utilize ATM technology in combination with and mainly based on Switched Ethernet or Token Ring network topologies. The existing switching technology enables each user on the network to have their own dedicated bandwidth, e.g., 10 Mbps or 100 Mbps, for their networked software applications. Each user is given network connectivity to the local switched hub, e.g., 100 Mbps for a Fast Ethernet network interface card (NIC). In typically office building environments, each floor is provided with one or more switched hubs that users are directly connected to. If the switched hub has 16 10 Mbps ports than it may potentially be forced to handle 1,600 Mbps data rate from all the connected users.

Currently available conventional technology, using electrical processing, forces the switched hub to analyze every bit of information and to determine its destination. Even in the event though most of the data is not switched between the local ports on the switch but rather is passed up to higher levels of switching, all the information still must be analyzed by the switched hub. This bottleneck for data that is not switched locally leads to high data rates within the switch. The high internal data rates result in a more complicated design in terms of both hardware and software, thus increasing the cost of the switch.

A networking strategy commonly used today is to use an all Ethernet network comprising a plurality of switches (switching hubs) connected to a network backbone. Each floor in the enterprise has one or more switched hubs connected to end users. Each switch comprises a port interface section, switch section and an interface that is typically at a higher speed that the port interfaces. A plurality of ports connects the end users to the switch.

Each switch on each floor is connected via a dedicated physical cable to the network backbone. The network backbone comprises one or more switches connected in some arrangement. In addition, the switches or other network equipment from one or more other buildings may be connected to this network. An example of a suitable workstation Ethernet switch is the LinkSwitch 2700 manufactured by 3Com Corporation, Santa Clara, Calif.

Each end user on the network is connected to a port in one of the switches at a rate of either 10 or 100 Mbps. The link between each switch and the network backbone may be over fiber optic cable at Fast Ethernet or 1 Gbps data rates, for example. Alternatively, the downlinks from each of the switched hubs to the network backbone can be a protocol other then Ethernet such as ATM, FDDI, etc. For example, the interface portion may comprise an ATM interface, FDDI interface, etc. If a protocol other then Ethernet, e.g., ATM, is used on the downlinks from the switched to the network backbone, than some form of local area network emulation (LANE) must be used to provide connectivity Ethernet between end users.

In many cases, the protocol in use on the downlinks will differ from the protocol used on the connections to the end users, e.g., 10 Mbps to the end users and ATM on the downlinks. It is important to note, however, that regardless of the protocol used on the downlinks, a separate cable (optical fiber or copper) is required from each switched hub to the network backbone.

This commonly used network topology has several disadvantages. One disadvantage is that depending on the length and type of cabling used, the cost could end up being quite high. In addition, depending on the number of switches used in the network, the number of individual fiber optic cables could be very high. Another disadvantage is that the bandwidth available from each floor to the network backbone is limited. For example if fast Ethernet 100 Mbps is used, that the maximum bandwidth available to the switch is 100 Mbps, no more.

Also, another disadvantage is that the only type of connections possible using such a network topology are point to point connections. Multicast (MC) connections are possible but they are not simple or trivial to implement. Multicast connections require large amounts of overhead to implement whereby each call must be routed through the network backbone. Multicast connections also require special call setup procedures that can be potentially draining on system resources if the number of connections is large.

Another disadvantage is that the network backbone must be used to establish many of the connections. The connections that must be routed through the backbone include any connection between two different switches.

Wave Division Multiplexing

Wave division multiplexing (WDM) technology enables the simultaneous transmission of multiple data channel connections on the same physical optical fiber. This is achieved by utilizing several different wavelengths on the same optical fiber at the same time. The WDM transmission network comprises a plurality of optical transmitters, a wave division multiplexor, optical transmitter, optical fiber transmission line, optical receiver, wave division demultiplexor and a plurality of optical receivers.

Using this type of network, several data sources can be sent simultaneously into the WDM mux whereby each data source uses a different wavelength. The optical WDM mux functions to combine the different wavelengths into one optical transmission light beam. This optical light beam is transmitted onto the optical fiber using the optical transmitter. The fiber carries all the connections simultaneously. The optical light beam reaches the optical receiver that outputs the light beam to the WDM demux. The WDM demux functions to split the optical light beam into the different wavelengths that were originally sent. The different wavelength outputs of the WDM demux are input to the individual receivers that convert the light energy into electrical signals.

Currently, the major use of WDM technology is in Wide Area Network (WAN) applications. The majority of WANs already has a large installed base of optical fiber. The optical fiber installed in WANs typically carry very high data rate traffic on the order of many gigabits per second. In addition, the demand for bandwidth and capacity is growing at an explosive rate. Today's WAN installations are being pushed to capacity in order to satisfy the demand for increasing levels of bandwidth.

Two different techniques can be used to transmit data at higher rates: (1) adding additional optical fibers or (2) to increase the rate of data at the edge devices on either end of the optical fiber. Both of these solutions are very costly: installing additional fiber optic cable is very costly and developing faster end equipment is difficult and expensive.

Currently available WDM technology, however, is a viable alternative to installing new fiber optic cable or upgrading the equipment on either end of the fiber. Using conventional WDM technology, several 'slow' conventional end devices can be connected to a WDM mux whereby several slower data sources are combined onto the same fiber and transmitted to the other end. At the far end of the fiber optic cable, the operation is reversed, i.e., the optical signal is optically WDM demuxed. Thus, WDM technology can be used as a bandwidth concentrator.

In a conventional switch, the assignment of a wavelength to an input data stream defines a specific path between an input port and an output port. In a broadcast connection, the data must be forwarded to all the ports. This means the transmitters must transmit on all wavelengths simultaneously, which is currently difficult to achieve even for a limited number of wavelengths. Further, in the case of a multicast connection, the problem is even more complicated. The transmitter port must transmit to a select group of ports wherein the members of the group are constantly changing. In the optical domain, this translates to sending multiple wavelengths simultaneously whereby the wavelengths are changing in random fashion, which is very difficult and impractical to achieve.

SUMMARY OF THE INVENTION

Throughout this document the term wave division multiplexing (WDM) denotes using a single optical fiber to transmit several communications channels simultaneously whereby each channel transmits data utilizing a different wavelength of light. The term dense wavelength division multiplexing (DWDM) denotes WDM that utilizes several wavelengths of light that are relatively close to one another.

The type of environment suitable for application of the present invention is any data communications network such as found on college campuses or other large enterprises. Many companies that currently implement data networks with backbones using switched Ethernet and/or ATM technology can benefit from the features of the present invention. The optical switching apparatus of the present invention, in combination with wave division multiplexing, provides a novel solution to the problems of the prior art as described hereinabove.

The present invention utilizes WDM or DWDM technology to construct an optical switch suitable for use in both WAN and LAN environments.

Devices are connected to the optical switch via a physical interface module. Each input to the switch is assigned a separate wavelength via a tunable electrical to optical transmitter. The output of the transmitters are input to a star coupler which combines all the optical signals into a single optical output signal. This signal, in turn, is input to an optical demultiplexor which functions to split the incoming optical signal into a plurality of separate wavelengths with each wavelength steered to a particular output port. The output of each port, corresponding to a particular wavelength, is then converted into an electrical signal by an optical to electrical receiver. This first embodiment of the switch supports unicast connects. A controller configures the tunable transmitters to a particular wavelength in accordance with the desired output port for that input.

A plurality of unicast connections can be established simultaneously by assigning each tunable transmitter a different wavelength such that all wavelengths are mutually exclusive with each other. No two transmitters are tuned to the same wavelength at the same time. This prevents the unicast connections from overlapping with each other in the switch.

In a unicast connection, only the two end nodes transmit or receive the optical signals on the particular wavelength assigned to the connection. In a second embodiment of the optical switch, broadcast and multicast connections are handled. In a broadcast connection, the source node transmits and all output ports receive the optical signal on the particular wavelength assigned to that broadcast connection. One port transmits data while the rest of the input ports are placed in an idle state. The output of each port is input to a multiplexor along with an output of the optical demux dedicated to broadcast traffic, i.e., wavelength. A controller switches the multiplexors to output the broadcast signal such that all receivers output the same signal.

Multicast traffic is handled similarly except that rather than switch all the multiplexors to the dedicated multicast wavelength, only selected multiplexors are switched. The remaining multiplexors carry unicast traffic as normal. As a result, the output ports of the members of the multicast group all output the same wavelength, i.e., traffic.

There is provided in accordance with the present invention an optical switching matrix apparatus having N input ports and N output ports comprising N tunable transmitters adapted to convert an electrical input signal into an optical output signal, an N to 1 star coupler adapted to receive the N optical outputs of the tunable transmitters, the star coupled operative to generate a single optical output incorporating the N signals input thereto, a 1 to N demultiplexor adapted to receive the single optical output of the star coupler, the demultiplexor operative to generate N outputs each output having a unique dedicated wavelength associated therewith, N receivers adapted to receive the N output signals from the demultiplexor, the receivers operative to convert an optical input signal to an electrical output signal, a controller adapted to configure the N tunable transmitters such that each transmitter is tuned to a unique wavelength corresponding to a destination output port and wherein N is a positive integer.

The star coupler comprises a N to 1 dense wave division multiplexing (DWDM) star coupler and the demultiplexor comprises a 1 to N dense wave division multiplexing (DWDM) demultiplexor.

There is also provided in accordance with the present invention an optical switching matrix apparatus having N input ports, N output ports and M broadcast/multicast channels comprising N tunable transmitters adapted to convert an electrical input signal into an optical output signal, an N to 1 star coupler adapted to receive the N optical outputs of the tunable transmitters, the star coupled operative to generate a single optical output incorporating the N signals input thereto, a 1 to N+M demultiplexor adapted to receive the single optical output of the star coupler, the demultiplexor operative to generate N+M outputs each output having a unique dedicated wavelength associated therewith, N multiplexors coupled to the demultiplexor, each multiplexor adapted to receive one of N channels output of the demultiplexor and M dedicated broadcast/multicast channels, each multiplexor adapted to be configured to output one of N channels input thereto or one of the M dedicated broadcast/multicast channels, N receivers adapted to receive the N output signals from the N multiplexors, the receivers operative to convert an optical input signal to an electrical output signal, a controller adapted to configure the N tunable transmitters such that each transmitter is tuned to a unique wavelength corresponding to a destination output port or a broadcast/multicast group, the controller operative to configure any of the N input ports for unicast, broadcast or multicast transmission and wherein N and M are positive integers.

The multiplexors comprise M+1 inputs whereby a first input is coupled to one of N channels output of the demultiplexor and the remaining M inputs are coupled to the M broadcast/multicast channels output of the demultiplexor. The star coupler comprises a N to 1 dense wave division multiplexing (DWDM) star coupler and the demultiplexor comprises a 1 to N+M dense wave division multiplexing (DWDM) demultiplexor.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
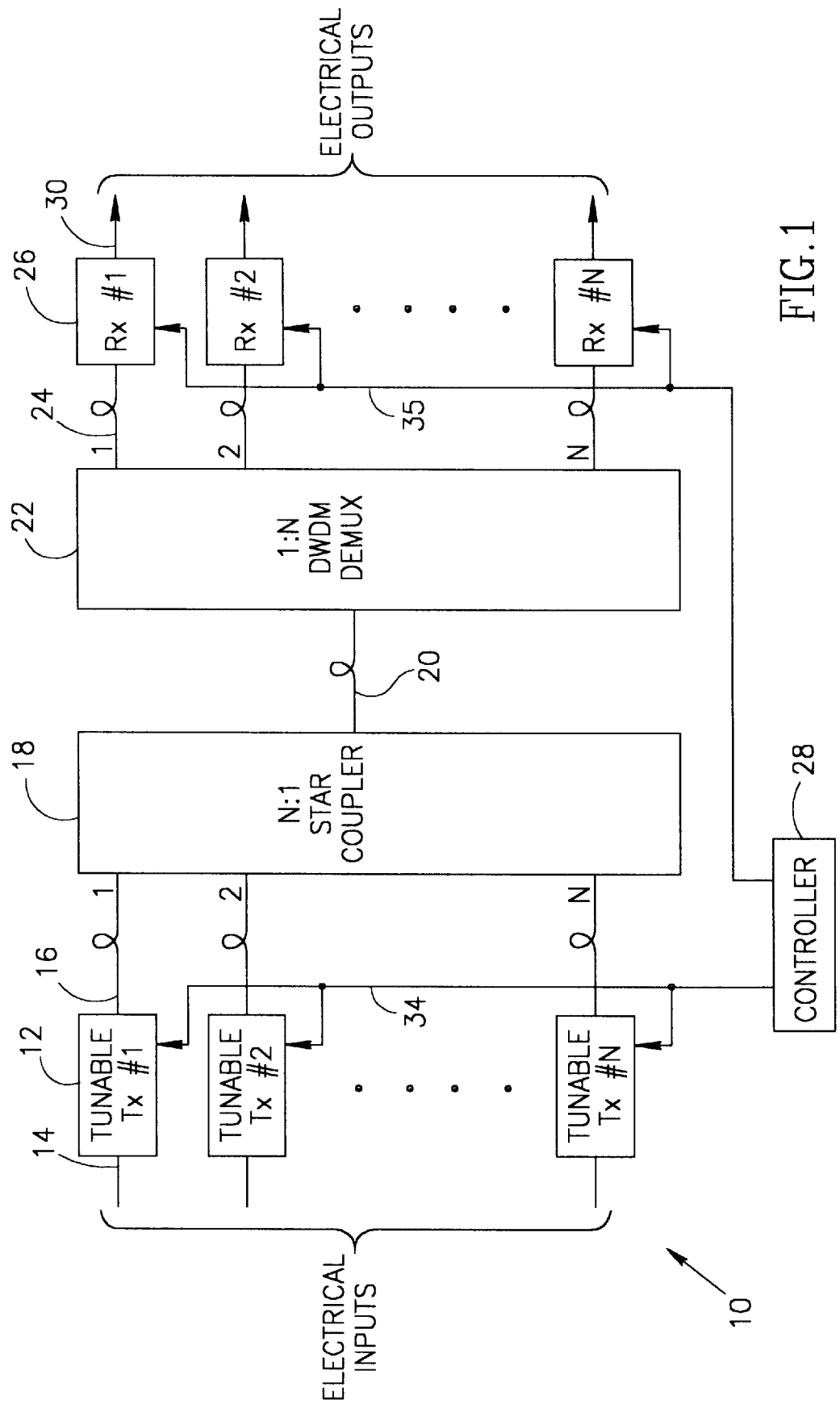
FIG. 1 is a block diagram illustrating a first embodiment of an optical switching core constructed in accordance with the present invention capable of handling unicast traffic.

The following notation is used throughout this document.

| Term | Definition |
| --- | --- |
| ANSI | American National Standards Institute |
| ATM | Asynchronous Transfer Mode |
| CCITT | Comite Consulatif International Telegraphique et Telephonique |
| DWDM | Dense Wavelength Division Multiplexing |
| FDDI | Fiber Distributed Data Interface |
| IP | Internet Protocol |
| ITU | International Telecommunications Union |
| LAN | Local Area Network |
| LANE | LAN Emulation |
| MC | Multicast |
| NIC | Network Interface Card |
| OC | Optical Carrier |
| TCP | Transmission Control Protocol |
| UNI | User to Network Interface |
| WAN | Wide Area Network |
| WDM | Wavelength Division Multiplexing |

General Description

The present invention is an optical switch that is capable of handling unicast, broadcast and multicast connections. The optical switch enables data to be switched in the optical domain as opposed to conventional switching in the electrical domain. This permits a very high data capacity and data rate. In accordance with the invention, any number of broadcast and/or multicast channels can be implemented in the switch. The switch is based on well-known WDM technology. The electrical inputs to the switching matrix are converted into optical signals on pre-assigned wavelengths. Each wavelength is dedicated to a specific optical output port. The sum of all the optical signals is broadcast towards each destination port. A WDM demux filters the signals such that each output only receives an optical signal having a specific wavelength. Unicast traffic is directed from a specific input port to a specific output port. Broadcast traffic is broadcast to all the output ports and multicast traffic is directed to a selected group of output ports.

A block diagram illustrating a first embodiment of an optical switching core constructed in accordance with the present invention capable of handling unicast traffic. The optical switching core, generally referenced 10, comprises a plurality of tunable transmitters 12 labeled tunable Tx #1 through tunable Tx #N. An electrical signal 14 is input to each tunable Tx. The tunable transmitters 12 function to convert the electrical input signal to an optical output signal 16. The wavelength of each transmitter is set by the controller 28 via control bus 34. The controller functions to set the wavelengths such that no two transmitters are set to the same wavelengths simultaneously.

Each optical transmitter 12 functions to convert electrical signals into optical signals. The enabling and disabling of each optical transmitter 12 can optionally be controlled by the controller 28. The Optical Transmitter Module part number NYW-40 ITU Tunable Channel Plan Laser, manufactured by Altitun AB, Kista, Sweden, is suitable for use with the present invention. Note that each transmitter is tuned so as to generate an optical signal having a specific wavelength.

The optical signal generated by each transmitter 12 is input to a N:1 star coupler (WDM mux) 18 via optical fibers 16. Each of the N optical signals output of the plurality of transmitters 12 are input to one of the inputs ports of the N to 1 star coupler or WDM mux 18. The WDM mux functions to combine the N optical input channels into a single egress optical output channel. Each of the N optical input signals, each having a different wavelength, i.e., $\lambda_1, \lambda_2 \ldots \lambda_N$, are combined into a single optical signal. A suitable 16 to 1 optical WDM mux is the 16 channel narrow band Dense WDM mux model WD15016-M2 manufactured by JDS Fitel, Inc., Ontario, Canada. Optical channel spacings on the order of 200 GHz can be achieved with this dense WDM mux device.

The output signal is subsequently input to a 1:N WDM demultiplexor (demux) 22 via optical fiber 20. The demux 22 functions to demultiplex the N wavelengths into N individual output ports whereby each output port is dedicated to a particular wavelength. The optical signal input to the demux 22 is split into N different optical signals each having a different wavelength, i.e., $\lambda_1, \lambda_2 \ldots \lambda_N$. A suitable 1 to 16 optical WDM demux is the 16 channel narrow band Dense WDM demux model WD15016-D2 manufactured by JDS Fitel, Inc., Ontario, Canada. Optical channel spacings on the order of 200 GHz can be achieved with this dense WDM demux device.

Each of the optical output signals from the demux 22 is input via optical fibers 24 to N optical receivers 26 labeled Rx #1 through Rx #N. Each receiver 26 functions to convert an optical input signal to an electrical output signal 30. Optionally, a control signal 35 output from the controller 28 to each of the optical receivers determines which of the channels in the plurality of optical receivers are enabled and which are disabled, to save power, etc. The electrical signals output from the optical receivers 26 constitute the electrical output signals of the switching matrix 10. A suitable optical receiver module that can be used to construct a multichannel optical receiver is the PGR 5025 Optical Receiver Module manufactured by Ericsson Components AB, Kista-Stockholm, Sweden. Each of the receive channels is tuned to receive an optical signal on a specific wavelength.

The switching matrix 10 is suitable for handling unicast connection. At any one time, the switching matrix the tunable transmitters are configured to connect each input port to a different output port. During each cycle of the switch, i.e., each cell time or other cycle time, the transmitters 12 are programmed to a particular wavelength, the wavelength determining the destination output port.

Figure 2:
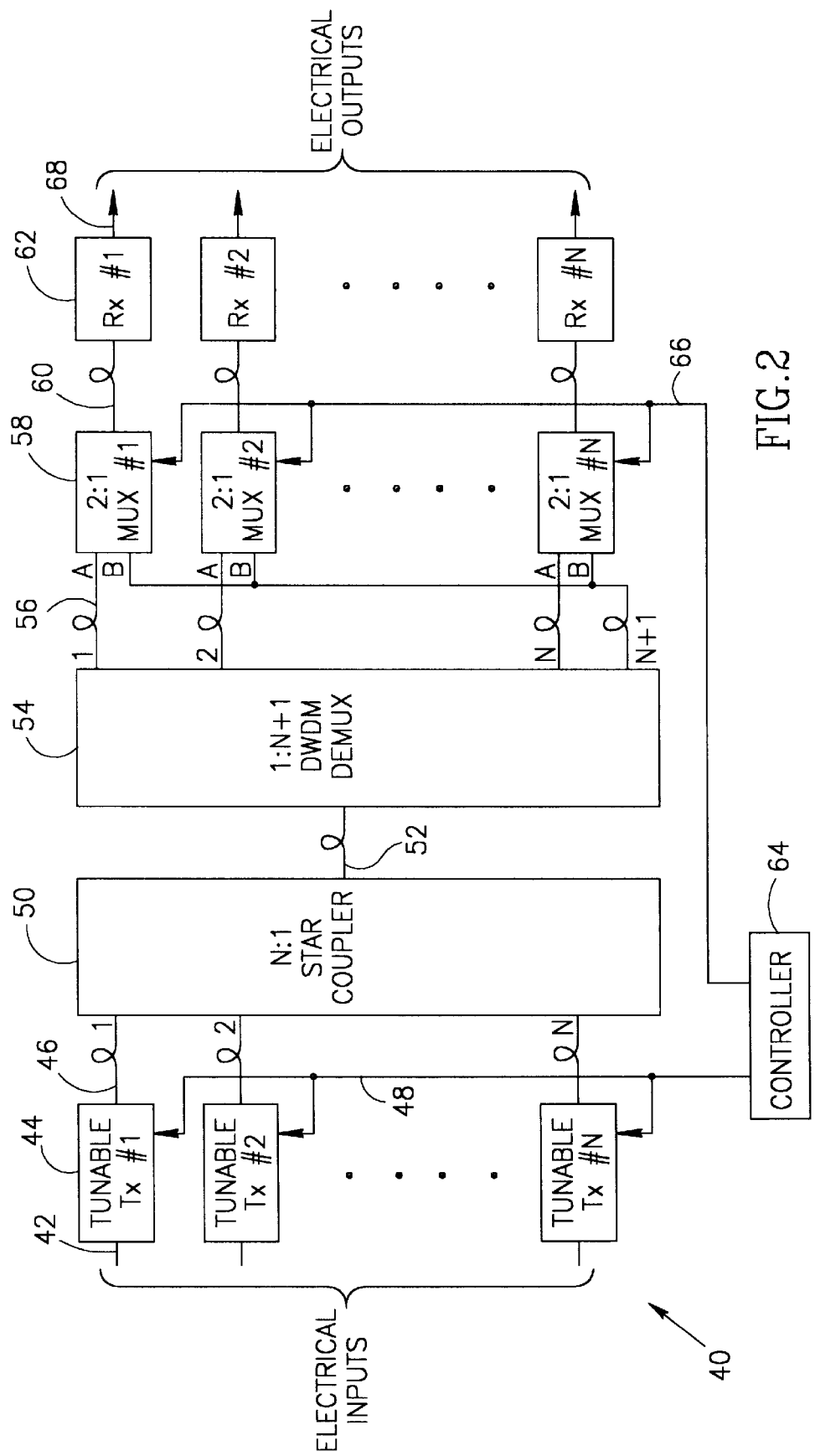
FIG. 2 is a block diagram illustrating a second embodiment of an optical switching core constructed in accordance with the present invention capable of handling unicast traffic and includes a single broadcast/multicast channel.

The present invention also comprises a second embodiment that enables the establishment of broadcast and multicast connections. A block diagram illustrating a second embodiment of an optical switching core constructed in accordance with the present invention capable of handling unicast traffic and includes a single broadcast/multicast channel is shown in FIG. 2.

The switching matrix, generally referenced 40, is constructed similarly to the matrix of FIG. 1 with the exception being the addition of a plurality of 2 to 1 muxes. In particular, the switching matrix 40 comprises a plurality of tunable transmitters 44 labeled tunable Tx #1 through tunable Tx #N. An electrical signal 42 is input to each tunable Tx. The tunable transmitters 44 function to convert the electrical input signal to an optical output signal 46. The wavelength of each transmitter is set by the controller 64 via control bus 48. The controller functions to set the wavelengths such that no two transmitters are set to the same wavelengths simultaneously. The operation and construction of optical transmitters 44 is similar to that of optical transmitters 12 (FIG. 1).

The outputs of the tunable transmitters 44 is input to an N to 1 star coupler (WDM mux) 50. The star coupler functions similarly to that of star coupler 18 (FIG. 1). The output of the star coupler is input to a 1:N+1 WDM demux 54 via optical fiber 52. In accordance with the invention, the demux 54 comprises an additional output channel having a dedicated unique wavelength. The first N channels correspond to the N input ports and the N+1$^{th}$ channel corresponds to the broadcast/multicast channel.

The optical output signal from channels 1 through N are input to 2 to 1 optical multiplexors 58 via optical fibers 56. Each mux 58 comprises two input ports, A and B, and an output port. The A input port of each mux 58 is coupled to one of output ports 1 through N of the WDM demux 54. The B input port of each mux 58 is coupled to the output of channel N+1 of the demux 54. In accordance with an input control signal, each 2 to 1 mux 58 outputs either the optical signal output from channels 1 through N or the output from channel N+1, i.e., the broadcast/multicast channel. A suitable 2 to 1 switch that can be used to construct the switch matrix 40 is the SL, SR or SW series of Fiber Optic Switch Modules manufactured by JDS Fitel, Inc., Ontario, Canada.

For unicast transmission, all the muxes 58 are configured by the controller 64 via control bus 66 to couple their respective A inputs to the output. For broadcast transmission, the controller 64 configures each mux 58 to couple its respective B input, i.e., the broadcast/multicast wavelength, to the output. While the switch is configured for broadcast, no unicast traffic can flow for that cycle.

The optical output of each mux 58 is input to an optical receiver 62 via optical fibers 60. The optical receiver 68 are constructed and operate similarly to the receivers 26 of FIG. 1. The receivers output an electrical signal 68 and constitute the output destination of the switching matrix.

Thus, for broadcast transmission, one of the input ports is given permission to broadcast to all the output ports. This is achieved by setting the port's corresponding tunable transmitter 44 to the broadcast/multicast wavelength. In addition, the controller must configure the plurality of 2 to 1 muxes 58 to couple the data at the B input to the output. This permits a single input port to transmit to all the output ports while the remainder of the transmit ports are in the idle state. The transmitting port sends the data on a dedicated broadcast/multicast wavelength that is not used by any other output port. The signal having this wavelength is filtered by the WDM demux 54 and will appear at the output channel N+1. The 2 to 1 muxes are switched so as to couple the broadcast signal to their outputs. When the broadcast is finished, the muxes are switched back to their A input ports.

Multicast transmissions as handled in a similar manner with the difference being that not all the 2 to 1 muxes 58 are switched to their B inputs. Only the muxes 58 corresponding to members of the multicast group are switched to connect the broadcast/multicast signal to the output. The remaining muxes are left in the unicast mode. The controller 64 functions to configure the muxes in accordance with the destination ports making up the multicast group.

In operation, the controller 64 configures the tunable transmitter 44 that is associated with the input port wishing to send multicast data. That transmitter is configured to the wavelength corresponding to the N+1 broadcast/multicast channel on the WDM demux 54. In addition, the 2 to 1 muxes 58 that correspond to the members of the multicast group are configured to connect their B inputs to the output. The remaining muxes are left in unicast mode, i.e., the A input is connected to the output.

It is important to point out that although the switching matrix comprises N input ports and N output ports, the matrix utilizes N+1 unique wavelengths. The additional wavelength being used for the broadcast/multicast channel.

The switching matrix 40 shown in FIG. 2 provides a single broadcast/multicast channel. Switching matrices with additional broadcast/multicast channels can be constructed by adding additional wavelength channels to the WDM demux combined with using multiplexors having a larger number of inputs.

In general, a switching matrix comprising N unicast channels and M broadcast/multicast channels requires N tunable transmitters wherein each transmitter is tunable over N+M wavelengths. In addition, a 1 to N+M WDM demux is required in addition to N (M+1) to 1 muxes.

For example, an eight port switching matrix comprising two broadcast/multicast channels, i.e., N equals 8 and M equals 2, requires 8 tunable transmitters wherein each transmitter is tunable over 10 wavelengths. A 1 to 10 WDM demux is required along with eight 3 to 1 muxes.

Figure 3:
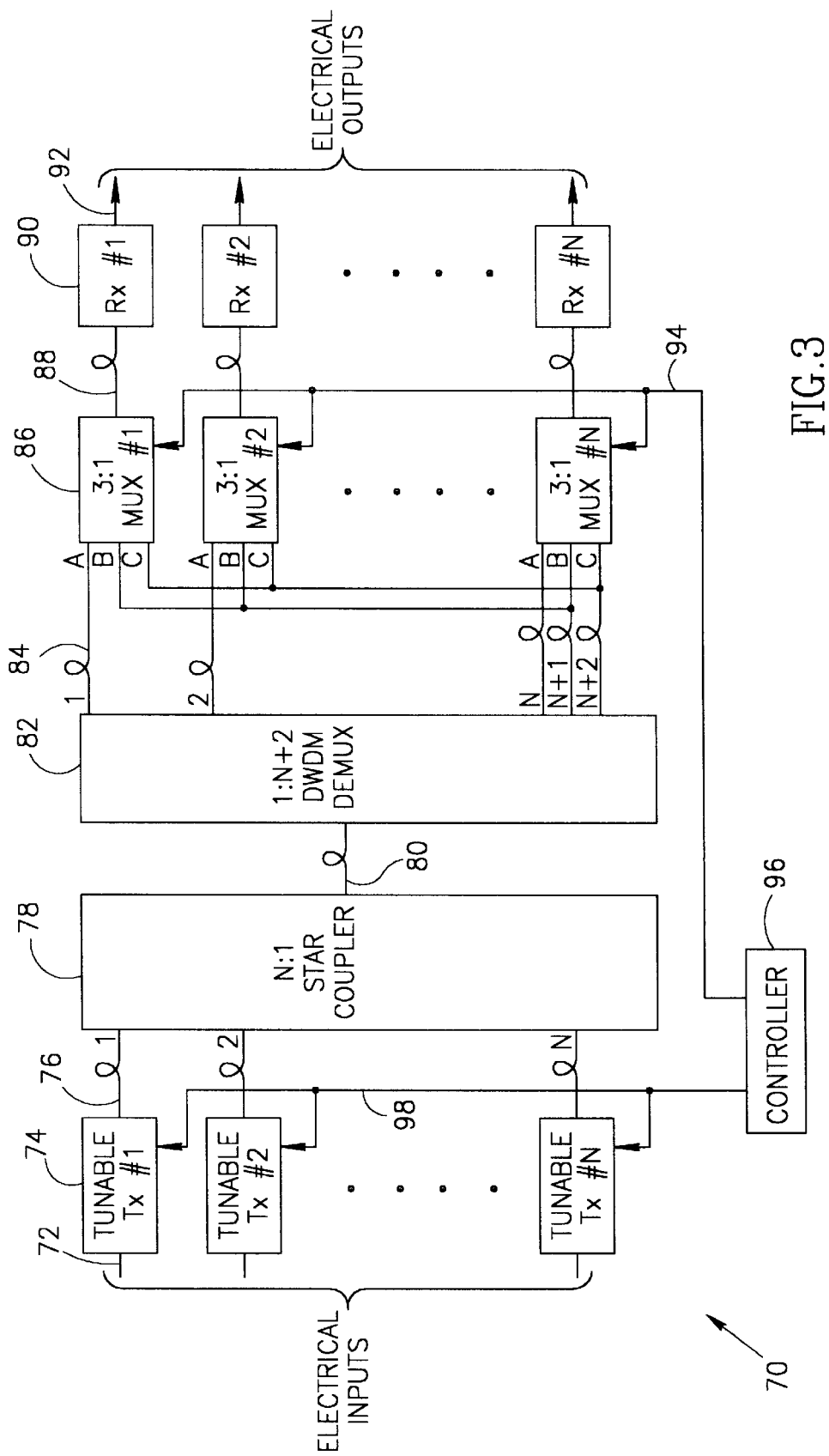
FIG. 3 is a block diagram illustrating a third embodiment of an optical switching core constructed in accordance with the present invention capable of handling unicast traffic and includes two broadcast/multicast channels.

A block diagram illustrating a third embodiment of an optical switching core constructed in accordance with the present invention capable of handling unicast traffic and includes two broadcast/multicast channels is shown in FIG. 3.

The switching matrix, generally referenced 70, is constructed similarly to the matrix of FIG. 2 with the exception being the 3 to 1 muxes in place of 2 to 1 muxes. In particular, the switching matrix 70 comprises a plurality of tunable transmitters 74 labeled tunable Tx #1 through tunable Tx #N. Electrical signals 72 are input to tunable transmitters 74. The tunable transmitters 74 function to convert the electrical input signal to an optical output signal 76. The wavelength of each transmitter is set by the controller 96 via control bus 98. The controller functions to set the wavelengths such that no two transmitters are set to the same wavelengths simultaneously. The operation and construction of optical transmitters 74 is similar to that of optical transmitters 44 (FIG. 2).

The outputs of the tunable transmitters 74 is input to an N to 1 star coupler (WDM mux) 78. The star coupler functions similarly to that of star coupler 50 (FIG. 2). The output of the star coupler is input to a 1:N+2 WDM demux 82 via optical fiber 80. In accordance with the invention, the demux 82 comprises two additional output channels having dedicated unique wavelengths. The first N channels correspond to the N input ports and the N+1 and N+2 channel correspond to the two broadcast/multicast channels.

The optical output signal from channels 1 through N are input to 3 to 1 optical multiplexors 86 via optical fibers 84. Each mux 86 comprises three input ports, A, B, C and an output port. The A input port of each mux 86 is coupled to one of output ports 1 through N of the WDM demux 82. The B input port of each mux 86 is coupled to the output of channel N+1 of the demux 82. The C input port of each mux 86 is coupled to the output of channel N+2 of the demux 82. In accordance with an input control signal, each 3 to 1 mux 86 outputs either the optical signal output from channels 1 through N, the output from channel N+1 or the output of channel N+2, i.e., the two broadcast/multicast channels. A suitable 3 to 1 switch that can be used is the SL, SR or SW series of Fiber Optic Switch Modules manufactured by JDS Fitel, Inc., Ontario, Canada.

For unicast transmission, all the muxes 86 are configured by the controller 96 via control bus 94 to couple their respective A inputs to the output. For broadcast transmission, the controller 96 configures each mux 86 to couple either its respective B or C input, i.e., the broadcast/multicast wavelengths, to the output. While the switch is configured for broadcast, no unicast traffic can flow for that cycle for all output ports.

The optical output of each mux 86 is input to an optical receiver 90 via optical fibers 88. The optical receivers 90 are constructed and operate similarly to the receivers 26 of FIG. 1. The receivers output an electrical signal 92 and constitute the output destination of the switching matrix.

Thus, for broadcast transmission, one of the input ports is given permission to broadcast to all the output ports. This is achieved by setting the port's corresponding tunable transmitter 74 to one of the broadcast/multicast wavelengths. In addition, the controller must configure the plurality of 3 to 1 muxes 86 to couple the data at either the B or C input to the output. This permits a single input port to transmit to all the output ports while the remainder of the transmitting ports are in the idle state. The transmitting port sends the data on a dedicated broadcast/multicast wavelength that is not used by any other output port. The signal having this wavelength is filtered by the WDM demux 86 and will appear at either output channel N+1 or N+2. The 3 to 1 muxes are switched so as to couple one of the broadcast signals to the output. When the broadcast is finished, the muxes are switched back to their A input ports.

Multicast transmissions as handled in a similar manner with the difference being that not all the 3 to 1 muxes 86 are switched to their B or C inputs. Only the muxes 86 corresponding to members of a multicast group are switched to connect the broadcast/multicast signal to the output. The remaining muxes are left in the unicast mode. The controller 96 functions to configure the muxes in accordance with the destination ports making up the multicast group.

In this third embodiment, two multicast channels can operate simultaneously. The transmitter corresponding to a first multicast group is assigned and configured with wavelength N+1. The transmitter corresponding to a second multicast group is assigned and configured to wavelength N+2. Similarly, the 3 to 1 muxes 86 corresponding to the first multicast group are set by the controller 96 to connect their B inputs to the output. The 3 to 1 muxes 86 corresponding to the second multicast group are set to connect their C inputs to the output. The remaining muxes are left in unicast mode, i.e., the A input is connected to their output.

While the invention has been described with respect to a limited number of embodiments, it will be appreciated that many variations, modifications and other applications of the invention may be made.

What is claimed is:

1. An optical switching matrix apparatus having N input ports and N output ports, comprising:

N tunable transmitters adapted to convert an electrical input signal into an optical output signal;

an N to 1 star coupler adapted to receive the N optical outputs of said tunable transmitters, said star coupled operative to generate a single optical output incorporating the N signals input thereto;

a 1 to N demultiplexor adapted to receive said single optical output of said star coupler, said demultiplexor operative to generate N outputs each output having a unique fixed wavelength associated therewith;

N receivers adapted to receive the N output signals from said demultiplexor, each receiver comprising a wideband receiver and operative to convert an optical input signal to an electrical output signal;

a controller adapted to configure said N tunable transmitters such that each transmitter is tuned to a wavelength corresponding to one of the wavelength outputs of said demultiplexor associated with a destination output port; and wherein N is a positive integer.

2. The apparatus according to claim 1, wherein said star coupler comprises a N to 1 dense wave division multiplexing (DWDM) star coupler.

3. The apparatus according to claim 1, wherein said demultiplexor comprises a 1 to N dense wave division multiplexing (DWDM) demultiplexor.

4. An optical switching matrix apparatus having N input ports, N output ports and M broadcast/multicast channels, comprising:

N tunable transmitters adapted to convert an electrical input signal into an optical output signal;

an N to 1 star coupler adapted to receive the N optical outputs of said tunable transmitters, said star coupled operative to generate a single optical output incorporating the N signals input thereto;

a 1 to N+M demultiplexor adapted to receive said single optical output of said star coupler, said demultiplexor operative to generate N+M outputs each output having a unique fixed wavelength associated therewith;

N multiplexors coupled to said demultiplexor, each multiplexor adapted to receive one of N unique fixed wavelength channels output of said demultiplexor and M dedicated broadcast/multicast channels, each multiplexor adapted to be configured to output one of N channels input thereto or one of said M dedicated broadcast/multicast channels;

N receivers adapted to receive the N output signals from said N multiplexors, each receiver comprising a wideband receiver and operative to convert an optical input signal to an electrical output signal;

a controller adapted to configure said N tunable transmitters such that each transmitter is tuned to a wavelength corresponding to one of the fixed wavelength outputs of said demultiplexor associated with a destination output port or a broadcast/multicast group, said controller operative to configure any of said N input ports for unicast, broadcast or multicast transmission by suitable configuration of said multiplexors; and wherein N and M are positive integers.

5. The apparatus according to claim 4, wherein said multiplexors comprise M+1 inputs whereby a first input is coupled to one of N channels output of said demultiplexor and the remaining M inputs are coupled to said M broadcast/multicast channels output of said demultiplexor.

6. The apparatus according to claim 4, wherein said star coupler comprises a N to 1 dense wave division multiplexing (DWDM) star coupler.

7. The apparatus according to claim 4, wherein said demultiplexor comprises a 1 to N+M dense wave division multiplexing (DWDM) demultiplexor.

8. The apparatus according to claim 4, wherein M equals 1.

9. The apparatus according to claim 4, wherein M equals 2.

* * * * *